United States Patent
Ueno (10) Patent No.: US 7,861,817 B2
(45) Date of Patent: Jan. 4, 2011

(54) OCCUPANT PROTECTION APPARATUS FOR VEHICLE

(75) Inventor: Yukiyasu Ueno, Nishio (JP)

(73) Assignee: Denso Corporation, Kariya (JP)

( * ) Notice: Subject to any disclaimer, the term of this patent is extended or adjusted under 35 U.S.C. 154(b) by 74 days.

(21) Appl. No.: 12/380,123

(22) Filed: Feb. 24, 2009

(65) Prior Publication Data

US 2009/0218158 A1    Sep. 3, 2009

(30) Foreign Application Priority Data

Feb. 28, 2008  (JP) .............................. 2008-048381

(51) Int. Cl.
*B60K 28/10* (2006.01)

(52) U.S. Cl. .................................... 180/274

(58) Field of Classification Search ................ 180/274, 180/271; 280/735
See application file for complete search history.

(56) References Cited

U.S. PATENT DOCUMENTS

| | | | | |
|---|---|---|---|---|
| 7,417,873 | B2* | 8/2008 | Kadoya et al. ............ | 361/797 |
| 2003/0178826 | A1 | 9/2003 | Miyata et al. | |
| 2005/0099276 | A1 | 5/2005 | Fujioka | |
| 2006/0273559 | A1 | 12/2006 | Uono et al. | |

FOREIGN PATENT DOCUMENTS

| | | |
|---|---|---|
| JP | 10-287201 | 10/1998 |
| JP | 11-170963 | 6/1999 |
| JP | 11-255065 | 9/1999 |
| JP | 2002-046572 | 2/2002 |
| JP | 2005-008052 | 1/2005 |
| JP | 2005-145101 | 6/2005 |
| JP | 2006-076473 | 3/2006 |
| JP | 2006-131230 | 5/2006 |
| JP | 2006-341653 | 12/2006 |
| JP | 2007-050748 | 3/2007 |

OTHER PUBLICATIONS

Office action dated Jan. 14, 2010 in corresponding Japanese application No. 2008-048381.

* cited by examiner

*Primary Examiner*—Faye M. Fleming
(74) *Attorney, Agent, or Firm*—Harness, Dickey & Pierce, PLC (57) ABSTRACT

An occupant protection apparatus for a vehicle includes: a plurality of communication devices for communicating an external device; and a controller for determining a collision of the vehicle based on information transmitted from the external device via the plurality of communication devices and for activating an occupant protection device corresponding to the collision. The controller prohibits activation of the occupant protection device when the controller detects communication anomaly occurred at more than one communication device.

6 Claims, 4 Drawing Sheets

OCCUPANT PROTECTION APPARATUS FOR VEHICLE

CROSS REFERENCE TO RELATED APPLICATION

This application is based on Japanese Patent Application No. 2008-48381 filed on Feb. 28, 2008, the disclosure of which is incorporated herein by reference.

FIELD OF THE INVENTION

The present invention relates to an occupant protection apparatus for protecting an occupant in a vehicle. The device includes multiple communication devices for obtaining vehicle and occupant information.

BACKGROUND OF THE INVENTION

A conventional occupant protection apparatus prevents operation error even if a vehicle is submerged. The device is disclosed in JP-A-2006-131230. In JP-A-2006-131230, the device is an air bag system for a vehicle including a submersion detection unit. When the water penetrates in the vehicle after the vehicle is submerged, the submersion detection unit provides to cut power supply to an output control unit. Therefore, even if an inflation signal to the air bag is accidentally output in case of water penetration, the system prevents air bag inflation.

However, in the above system, it is necessary to add the submersion detection unit in the air bag system. Thus, the number of parts of the system increases, and a manufacturing cost of the system increases.

SUMMARY OF THE INVENTION

In view of the above-described problem, it is an object of the present disclosure to provide an occupant protection apparatus that prevents activation of an occupant protection element in case of submersion with a low manufacturing cost.

According to a first aspect of the present disclosure, an occupant protection apparatus for a vehicle includes: a plurality of communication devices for communicating an external device; and a controller for determining a collision of the vehicle based on information transmitted from the external device via the plurality of communication devices and for activating an occupant protection device corresponding to the collision. The controller prohibits activation of the occupant protection device when the controller detects communication anomaly occurred at more than one communication device.

In the above apparatus, when the controller detects the communication anomaly at more than one-communication device, the controller determines that the vehicle is submerged in water. Thus, the apparatus can detect the submersion without adding a new submersion detection element. When the vehicle is submerged, the apparatus prohibits the activation of the occupant protection device. The manufacturing cost of the apparatus is improved.

According to a second aspect of the present disclosure, an occupant protection apparatus for a vehicle include: a first communication device for coupling with an external collision sensor mounted on a front of the vehicle; a second communication device for coupling with an external collision sensor mounted on a side of the vehicle; a third communication device for coupling with an external occupant sensor; a fourth communication device for coupling with an external engine control unit; a controller for determining a collision of the vehicle based on signals transmitted from the external collision sensors via the first and second communication devices and for controlling activation of an occupant protection device based on the signals from the external collision sensors and signals transmitted from the external occupant sensor and the external engine control unit via the third and fourth communication devices; and a circuit board having upper and lower surfaces. The first and second communication devices and the controller are arranged on the upper surface of the circuit board. The third and fourth communication devices are arranged on the lower surface of the circuit board, and the controller prohibits activation of the occupant protection device when the controller detects communication anomaly occurred at both of the third and fourth communication devices.

Thus, the apparatus can detect the submersion without adding a new submersion detection element. When the vehicle is submerged, the apparatus prohibits the activation of the occupant protection device. The manufacturing cost of the apparatus is improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present inventor has studied about an occupant protection apparatus, which detects submersion without adding a new submersion detection element based on communication anomaly of a communication element caused by the submersion.

First Embodiment

Figure 1:
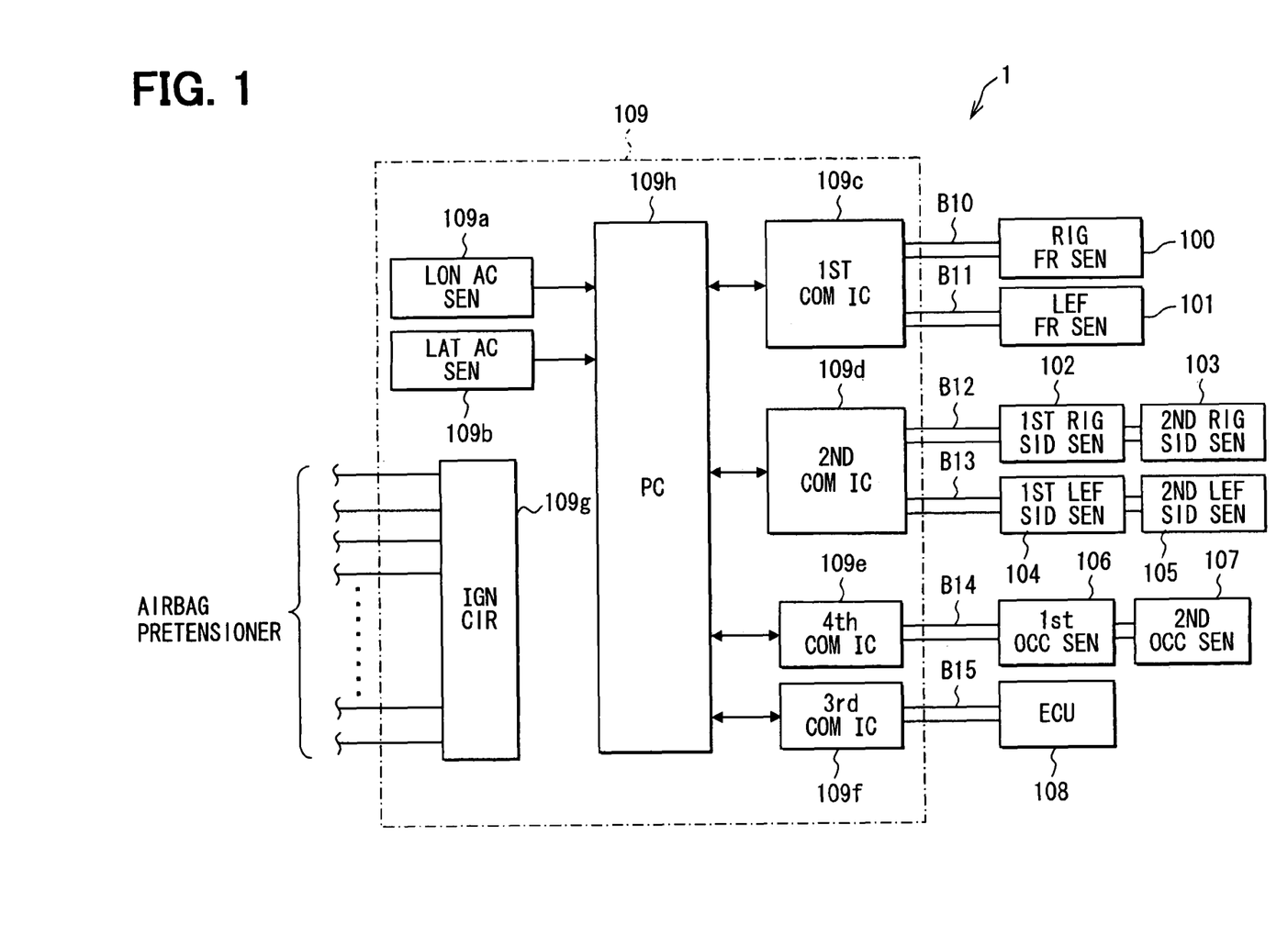
FIG. 1 is a block diagram showing an occupant protection apparatus according to a first embodiment.
Figure 2:
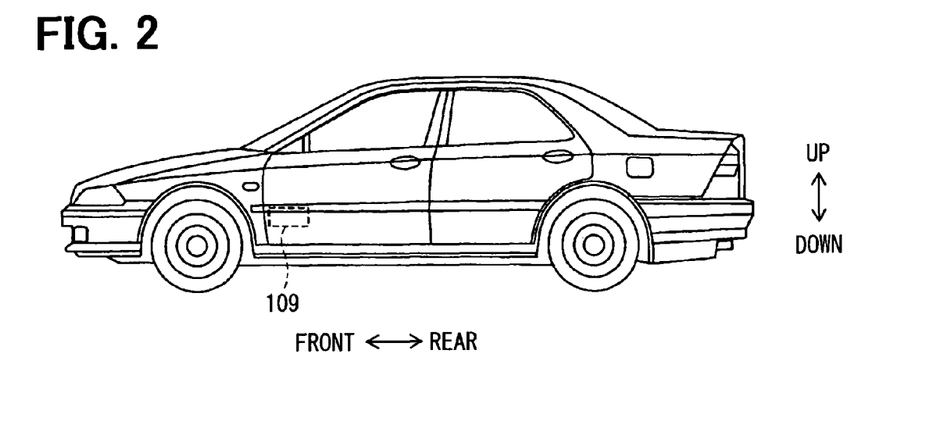
FIG. 2 is a diagram showing an arrangement of a controller in a vehicle.
Figure 3:
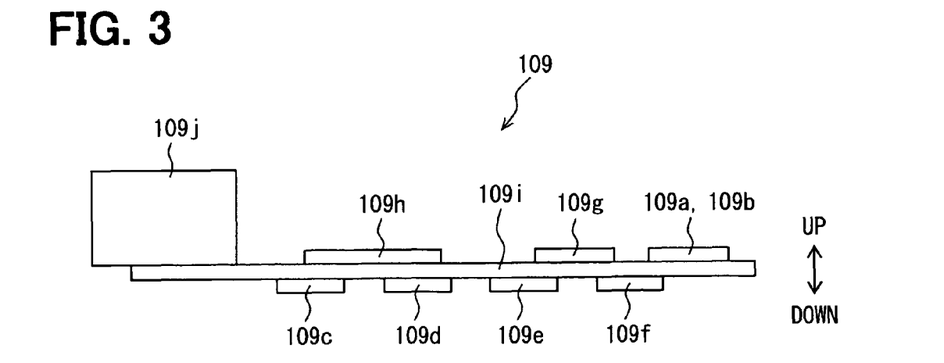
FIG. 3 is a diagram showing an arrangement of parts in the controller.

An occupant protection apparatus 1 according to a first embodiment is shown in FIG. 1. FIG. 2 shows an arrangement of a controller seeing from a side of a vehicle. FIG. 3 shows an arrangement of parts in the controller. Here, PC represents a micro computer, FRONT represents a front direction of the vehicle, REAR represents a rear direction of the vehicle, UP represents an up direction of the vehicle, and DOWN represents a down direction of the vehicle.

The protection apparatus 1 detects collision on a front and/or a side of the vehicle, and protects an occupant in the vehicle from the collision. The apparatus 1 includes a right front sensor 100, a left front sensor 101, first and second right side sensors 102, 103, first and second left side sensors 104, 105, first and second occupant sensors 106, 107, an engine control unit 108 and a controller 109 for the protection apparatus 1. The right front sensor 100, the left front sensor 101, the first and second right side sensors 102, 103 and the first and second left side sensors 104, 105, the first and second occupant sensors 106, 107 and the engine control unit 108 provide an external device.

The right front sensor 100 is arranged on a right front side of the vehicle, and detects collision in the front-rear direction of the vehicle. Specifically, the right front sensor 100 detects acceleration in the front-rear direction of the vehicle, and transmits a detection signal via a bus line B10. The left front sensor 101 is arranged on a left front side of the vehicle, detects acceleration in the front-rear direction of the vehicle, and transmits a detection signal via a bus line B11.

The first and second right side sensors 102, 103 are arranged on a right side of the vehicle near a first row of seats in a compartment of the vehicle and a second row of seats, respectively. The sensors 102, 103 detect collision in the right-left direction of the vehicle. Specifically, the sensors 102, 103 detect acceleration in the right-left direction of the vehicle, and transmit detection signals via a bus line B12. The first and second left side sensors 104, 105 are arranged on a left side of the vehicle near the first row of seats and the second row of seats, respectively. The sensors 102, 103 detect acceleration in the right-left direction of the vehicle, and transmit detection signals via a bus line B13.

The first and second occupant sensors 106, 107 are arranged on a driver seat and a passenger seat in the first row of seats as a front seat of the vehicle. Each sensor 106, 107 detects existence of an occupant and physical information such as a physical size of the occupant. The sensor 106, 107 transmits a detection signal via a bus line.

The engine control unit 108 controls an engine of the vehicle, and transmits a control signal having vehicle speed information via a bus line B15.

The controller 109 determines the collision based on the detection results of the right and left front sensors 100, 101, the first and second right side sensors 102, 103, the first and second left side sensors 104, 105, the first and second occupant sensors 106, 107 and an inner sensor and the vehicle speed information from the engine control unit 108. Then, the controller 109 controls to activate an air bag and a pretensioner, which are occupant protection elements. As shown in FIG. 2, the controller 109 is arranged at a center of the vehicle in the right-left direction. Specifically, the controller 109 is disposed under a floor near a foot of the occupant on a front seat. The controller 109 includes a longitudinal acceleration sensor 109a (i.e., a front-rear acceleration sensor) for detecting acceleration in the front-rear direction of the vehicle, a latitudinal acceleration sensor 109b (i.e., a right-left acceleration sensor) for detecting acceleration in the right-left direction of the vehicle, first to fourth communication ICs 109c-109f as a communication element, an ignition circuit 109g as an activation circuit, and a micro computer 109h as a controlling element.

The longitudinal acceleration sensor 109a is arranged in the controller 109, and detects the collision in the front-rear direction of the vehicle. Specifically, the sensor 109a detects the acceleration in the front-rear direction of the vehicle. The latitudinal acceleration sensor 109b is also arranged in the controller 109, and detects the collision in the right-left direction of the vehicle. Specifically, the sensor 109b detects the acceleration in the right-left direction of the vehicle.

The first communication IC 109c converts the detection results transmitted from the right and left front sensors 100, 101 via the bus line B11 to a predetermined signal having a predetermined format. In some cases, the first communication IC 109c transmits the signal to the micro computer 109h.

The second communication IC 109d converts the detection results transmitted from the first and second right side sensors 102, 103 and the first and second left side sensors 104, 105 via the bus lines B12, B13 to predetermined signals having a predetermined format, respectively. In some cases, the second communication IC 109d transmits the signal to the micro computer 109h. The third communication IC 109e converts the detection results transmitted from the first and second occupant sensors 106, 107 via the bus line B14 to a predetermined signal having a predetermined format. In some cases, the third communication IC 109e transmits the signal to the micro computer 109h. The fourth communication IC 109f converts the vehicle speed information transmitted from the engine control unit 110 via the bus line B15 to a predetermined signal having a predetermined format. In some cases, the fourth communication IC 109f transmits the signal to the micro computer 109h.

The first communication IC 109c is connected to the right and left front sensors 100, 101 via the bus lines B10, B11, respectively. The second communication IC 109d is connected to the first and second right side sensors 102, 103 and the first and second left side sensors 104, 105 via the bus lines B12, B13, respectively. The third communication IC 109e is connected to the first and second occupant sensors 106, 107 via the bus line B14. The fourth communication IC 109f is connected to the engine control unit 108 via the bus line B15.

The ignition circuit 109g activates the air bag and the pretensioner based on the ignition signal from the micro computer 109h.

The micro computer 109h determines the collision based on the detection results of the longitudinal and latitudinal acceleration sensors 109a, 109b, the detection results of the right and left front sensors 100, 101, the first and second right side sensors 102, 103, the first and second left side sensors 104, 105 and the first and second occupant sensors 106, 107 input via the first to fourth communication ICs 109c-109f and the vehicle speed information from the engine control unit 108. The micro computer 109h outputs the ignition signal to the ignition circuit so that the air bag and the pretensioner corresponding to the ignition signal are activated. Specifically, the micro computer b109h determines the collision on the front of the vehicle based on the detection results of the longitudinal acceleration sensor 109a, and the right and left front sensors 100, 101. The micro computer 109h determines the collision on the side of the vehicle near the front seats of the vehicle based on the detection results of the latitudinal acceleration sensor 109b, and the first right and left side sensors 102, 104. The micro computer 109h determines the collision on the side of the vehicle near the rear seats based on the detection results of the latitudinal acceleration sensor 109b and the second right and left side sensors 103, 105. The micro computer 109h determines the corresponding air bag and the corresponding pretensioner to be activated on the basis of the detection results of the first and second occupant sensors 106, 107 and the vehicle speed information of the engine control unit 108. Further, the micro computer 109h outputs the corresponding ignition signal.

The micro computer 109h is connected to the longitudinal and latitudinal acceleration sensors 109a, 109b. Further, the micro computer 109h is connected to the first to fourth communication ICs 109c-109f via internal bus lines, respectively. Furthermore, the micro computer 109h is connected to the ignition circuit 109g.

As shown in FIG. 3, the longitudinal and latitudinal acceleration sensors 109a, 109b, the ignition circuit 109g and the micro computer 109h are arranged on an upper surface of a circuit board 109i. A connector 109j is also mounted on the upper surface of the board 109*i*. The first to fourth communication ICs 109*c*-109*f* are arranged on a lower surface of the board 109*i*.

Figure 4:
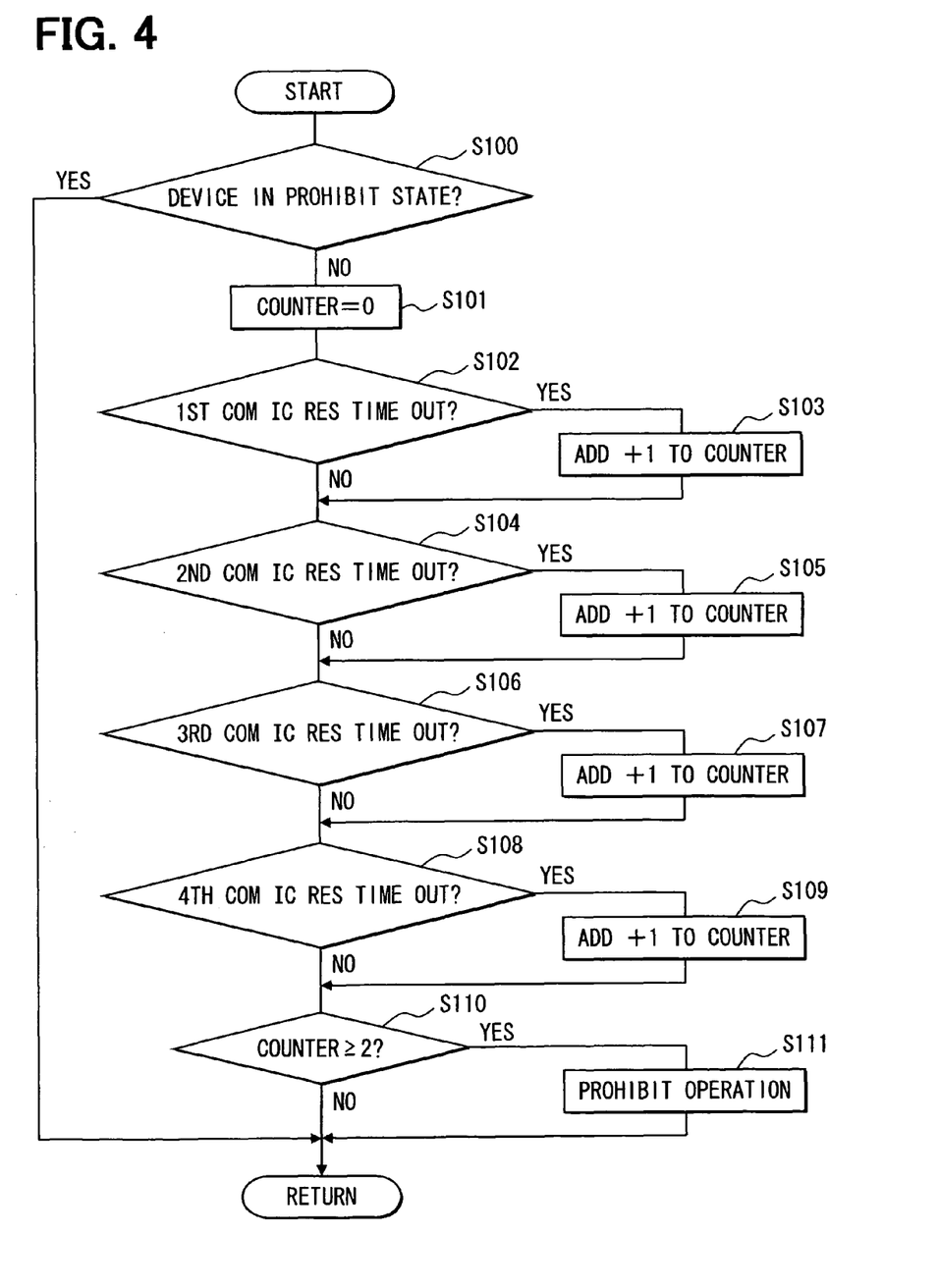
FIG. 4 is a flowchart showing a submersion determination process according to the first embodiment.

The functions of the apparatus 1 will be explained as follows. FIG. 4 shows a flowchart of submersion determination process in the apparatus 1.

The function of the apparatus 1 in case of the collision on the right front of the vehicle will be explained. When the collision on the right front of the vehicle occurs, the acceleration in the front-rear direction corresponding to the collision is generated. The acceleration is mainly and prominently detected by the right front sensor 100. Further, the acceleration is detected by the longitudinal acceleration sensor 109*a* in the controller 109. The detection result of the right front sensor 100 is transmitted to the controller 109 via the bus line B10. The first communication IC 109*c* converts the transmitted detection result to have a predetermined format. Then, the converted result is input into the micro computer b109*h*. The detection results of the first and second occupant sensors 106, 107 and the vehicle speed information from the engine control unit 108 are transmitted to the controller 109 via the bus lines B14, B15, respectively. The third and fourth communication ICs 109*e*, 109*f* convert the transmitted detection results and information to have a predetermined format. Then, the converted results and information are input into the micro computer 109*h*.

The micro computer 109*h* determines the collision on the right front of the vehicle based on the detection results of the right front sensor 100 and the longitudinal acceleration sensor 109*a*. Specifically, when an integration value of the acceleration per a predetermined interval that is detected by the right front sensor 100 exceeds a predetermined threshold, and when an integration value of the acceleration per a predetermined interval that is detected by the longitudinal acceleration sensor 109*a* exceeds a predetermined threshold, the micro computer 109*h* determines that the collision on the right front of the vehicle occurs. Then, the micro computer 109*h* determines the air bag and the pretensioner corresponding to the collision on the right front of the vehicle based on the detection results of the first and second occupant sensors 106, 107 and the vehicle speed information of the engine control unit 108. Then, the micro computer 109*h* outputs the ignition signal corresponding to the air bag and the pretensioner. When the ignition signal is input into the ignition circuit 109*g*, the ignition circuit 109*g* activates the air bag and the pretensioner corresponding to the collision on the right front of the vehicle. Thus, the air bag and the pretensioner protect the occupant from the collision.

Next, the functions of the apparatus 1 in case of the collision on the right side of the vehicle near the front seats of the vehicle will be explained. When the collision on the right side near the front seats of the vehicle occurs, the acceleration in the right-left direction of the vehicle is generated. The acceleration is mainly and prominently detected by the first right side sensor 102. Further, the latitudinal acceleration sensor 109*b* in the controller 109 also detects the acceleration. The detection result of the first right side sensor 102 is transmitted to the controller 109 via the bus line B12. The transmitted detection result is converted by the second communication IC 109*d* to have a predetermined format. Then, the converted result is input into the micro computer 109*h*. The detection results of the first and second occupant sensors 106, 107 and the vehicle speed information from the engine control unit 108 are transmitted to the controller 109 via the bus lines B14, B15, respectively. The third and fourth communication ICs 109*e*, 109*f* convert the transmitted detection results and information to have a predetermined format. Then, the converted results and information are input into the micro computer 109*h*. Further, the detection result of the latitudinal acceleration sensor 109*b* is also input into the micro computer 109*h*.

The micro computer 109*h* determines the collision on the right side of the vehicle neat the front seats of the vehicle based on the detection results of the first right side sensor 102 and the latitudinal acceleration sensor 109*b*. Specifically, when an integration value of the acceleration per a predetermined interval that is detected by the first right side sensor 102 exceeds a predetermined threshold, and when an integration value of the acceleration per a predetermined interval that is detected by the latitudinal acceleration sensor 109*b* exceeds a predetermined threshold, the micro computer 109*h* determines that the collision on the right side of the vehicle near the front seats occurs. Then, the micro computer 109*h* determines the air bag and the pretensioner corresponding to the collision on the right side of the vehicle near the front seats based on the detection results of the first and second occupant sensors 106, 107 and the vehicle speed information of the engine control unit 108. Then, the micro computer 109*h* outputs the ignition signal corresponding to the air bag and the pretensioner. When the ignition signal is input into the ignition circuit 109*g*, the ignition circuit 109*g* activates the air bag and the pretensioner corresponding to the collision on the right side of the vehicle near the front seats. Thus, the air bag and the pretensioner protect the occupant from the collision.

Next, the functions of the apparatus 1 in case of the collision on the right side of the vehicle near the rear seats of the vehicle will be explained. When the collision on the right side near the rear seats of the vehicle occurs, the acceleration in the right-left direction of the vehicle is generated. The acceleration is mainly and prominently detected by the second right side sensor 103. Further, the latitudinal acceleration sensor 109*b* in the controller 109 also detects the acceleration. The detection result of the second right side sensor 103 is transmitted to the controller 109 via the bus line B12. The transmitted detection result is converted by the second communication IC 109*d* to have a predetermined format. Then, the converted result is input into the micro computer 109*h*. The detection results of the first and second occupant sensors 106, 107 and the vehicle speed information from the engine control unit 108 are transmitted to the controller 109 via the bus lines B14, B15, respectively. The third and fourth communication ICs 109*e*, 109*f* convert the transmitted detection results and information to have a predetermined format. Then, the converted results and information are input into the micro computer 109*h*. Further, the detection result of the latitudinal acceleration sensor 109*b* is also input into the micro computer 109*h*.

The micro computer 109*h* determines the collision on the right side of the vehicle near the rear seats of the vehicle based on the detection results of the second right side sensor 103 and the latitudinal acceleration sensor 109*b*. Specifically, when an integration value of the acceleration per a predetermined interval that is detected by the second right side sensor 103 exceeds a predetermined threshold, and when an integration value of the acceleration per a predetermined interval that is detected by the latitudinal acceleration sensor 109*b* exceeds a predetermined threshold, the micro computer 109*h* determines that the collision on the right side of the vehicle near the rear seats occurs. Then, the micro computer 109*h* determines the air bag and the pretensioner corresponding to the collision on the right side of the vehicle near the rear seats based on the detection results of the first and second occupant sensors 106, 107 and the vehicle speed information of the engine control unit 108. Then, the micro computer 109*h* outputs the ignition signal corresponding to the air bag and the pretensioner.

When the ignition signal is input into the ignition circuit 109g, the ignition circuit 109g activates the air bag and the pretensioner corresponding to the collision on the right side of the vehicle near the rear seats. Thus, the air bag and the pretensioner protect the occupant from the collision.

The collision on the left side of the vehicle is similarly detected by using the first and second left side sensors 104, 105 and the left front sensor 101. Thus, the air bag and the pretensioner protect the occupant from the collision.

Next, the function for determining the submersion will be explained. The micro computer 109h executes a submersion determination process shown in FIG. 4. The micro computer 109h determines in Step S100 whether the occupant protection apparatus 1 has been prohibited from functioning so that the apparatus 1 is in a function prohibition state. When the apparatus 1 is in the function prohibition state, the micro computer 109h maintains the function prohibition state. When the apparatus 1 is not in the function prohibition state, the micro computer 109h sets a counter value to be zero in Step S101. The counter value represents the number of communications, in which anomaly occurs.

In Step S102, the micro computer 109h determines whether the communication by using the first communication IC 109c shows response time out. Here, the response time out means that response such as the detection result from the first communication IC 109c is not transmitted to the micro computer 109h within a predetermined time. When the first communication IC 109c functions normally, the response is transmitted from the first communication IC 109c to the micro computer 109h within the predetermined time. Thus, the micro computer 109h can determine based on the response time out whether the first communication IC 109c functions abnormally. The predetermined time as criteria for determining the response time out is determined by considering time variation of the communication, and set as short as possible. When the communication of the first communication IC 109c shows the response time out, i.e., when the communication anomaly occurs in the first communication IC 109c, the micro computer 109h adds one to the counter value in Step S103. When the communication of the first communication IC 109c does not show the response time out, i.e., when the communication from the first communication IC 109c is normal, the micro computer 109h maintains the counter value so that the counter value is not changed.

In Step S104, the micro computer 109h determines whether the communication by using the second communication IC 109d shows response time out. When the communication of the second communication IC 109d shows the response time out, i.e., when the communication anomaly occurs in the second communication IC 109d, the micro computer 109h adds one to the counter value in Step S105. When the communication of the second communication IC 109d does not show the response time out, i.e., when the communication from the second communication IC 109d is normal, the micro computer 109h maintains the counter value so that the counter value is not changed.

Similarly, in Steps S106-S109, the micro computer 109h determines whether the communication of the third and fourth communication ICs 109e, 109f show a response time out. When the communication of the third and fourth communication ICs 109e, 109f show the response time out, the micro computer 109h adds one to the counter value, respectively.

In Step 110, the micro computer 109h determines whether the counter value is equal to or larger than two. Specifically, the micro computer 109h determines whether the communication anomaly occurs in more than one communication ICs 109c-109f. When the counter value is equal to or smaller than one, the micro computer 109h does not prohibit the operation of the occupant protection apparatus 1, and the apparatus 1 protects the occupant when the apparatus 1 detects the collision of the vehicle. When the counter value is equal to or larger than two, the micro computer 109h prohibits the operation of the apparatus 1 in Step S111. Specifically, the micro computer 109h determines that the communication anomaly occurs in more than one communication ICs 109c-109f, and the micro computer 109h determines that the vehicle is submerged in water. Then, the micro computer 109h prohibits from outputting the ignition signal. Thus, when the vehicle is submerged, the air bag and the pretensioner are prohibited from activating.

The controller 109 is arranged under the floor of the vehicle near a foot of an occupant on a front seat. When the vehicle is submerged, the controller 109 is also submerged. As shown in FIG. 3, the first to fourth communication ICs 109c-109f are mounted on the lower surface of the board 109i. Accordingly, when the vehicle is submerged, the communication anomaly occurs. At this time, since the ignition circuit 109g and the micro computer 109h are mounted on the upper surface of the board 109i, the micro computer 109h functions normally without being affected by the penetrated water, compared with the first to fourth communication ICs 109c-109f. The micro computer 109h can function normally longer time than the first to fourth communication ICs 109c-109f. Accordingly, the micro computer 109h can prohibit the activation of the air bag and the pretensioner based on the detection of the communication anomaly when the vehicle is submerged in water.

The effects of the apparatus 1 according to the first embodiment will be explained. The apparatus 1 includes the first to fourth communication ICs 109c-109f for inputting the detection results transmitted from the right front sensor 100, the left front sensor 101, the first and second right side sensors 102, 103, the first and second left side sensors 104, 105, and the first and second occupant sensors 106, 107 and the vehicle speed information transmitted from the engine control unit 108. The first to fourth communication ICs 109c-109f input the detection results and the vehicle speed information into the micro computer 109h. When the first to fourth communication ICs 109c-109f are submerged, the ICs 109c-109f are disposed in unexpected environment. Thus, communication anomaly easily occurs. Further, multiple communication ICs 109c-109f may function abnormally. Thus, the possibility of multiple IC anomaly becomes high. In general, the possibility of multiple IC anomaly is very low when the apparatus 1 functions normally. However, when the vehicle is submerged, the multiple IC anomaly easily occurs. Accordingly, when the micro computer 109h detects multiple IC anomaly, the micro computer 109h can determine that the vehicle is submerged. Thus, without adding a new submersion detection element, the apparatus 1 can detect the submersion of the vehicle in water. The manufacturing cost of the apparatus 1 that prohibits the activation of the air bag and the pretensioner in case of submersion is reduced.

The first to fourth communication ICs 109c-109f are mounted on the lower surface of the circuit board 109i, which is arranged in parallel to the ground. Specifically, the board 109i extends along with the horizontal direction of the vehicle. The micro computer 109h is mounted on the upper surface of the board 109i. When the vehicle is submerged, the water penetrates into the vehicle. The penetrated water increases from a bottom side of the vehicle to a top side of the vehicle. Thus, the communication anomaly primarily occurs. Since the micro computer 109h is disposed on the upper surface of the board 109i, the micro computer 109h can function normally longer time than the first to fourth communication ICs 109c-109f. Accordingly, the micro computer 109h determines the submersion of the vehicle in water based on the communication anomaly.

The ignition circuit 109g is mounted on the upper surface of the board 109i. Thus, even if the vehicle is submerged and the communication anomaly occurs, the ignition circuit 109g together with the micro computer 109h can function normally without being affected by the penetrated water. Thus, the ignition circuit 109g functions normally longer time than the first to fourth communication ICs 109c-109f. Thus, the apparatus 1 prohibits the activation of the air bag and the pretensioner when the vehicle is submerged in water.

In the first embodiment, the communication anomaly is detected based on the response time out of the ICs 109c-109f. Alternatively, the communication anomaly may be detected by other ways.

In the first embodiment, when the communication anomaly occurs at more than one IC 109c-109f, the micro computer determines that the vehicle is submerged, and the micro computer 109h prohibits the output of the ignition signal. Alternatively, the micro computer 109h may set the detection result of the collision to be zero. Alternatively, the micro computer 109h may stop collision determination process. In these cases, the activation of the air bag and the pretensioner is prohibited.

Second Embodiment

Figure 5:
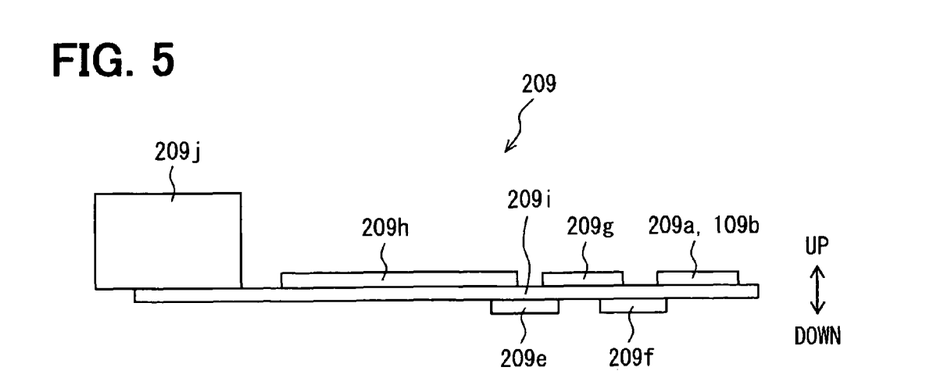
FIG. 5 is a diagram showing an arrangement of parts in a controller of an occupant protection apparatus according to a second embodiment.
Figure 6:
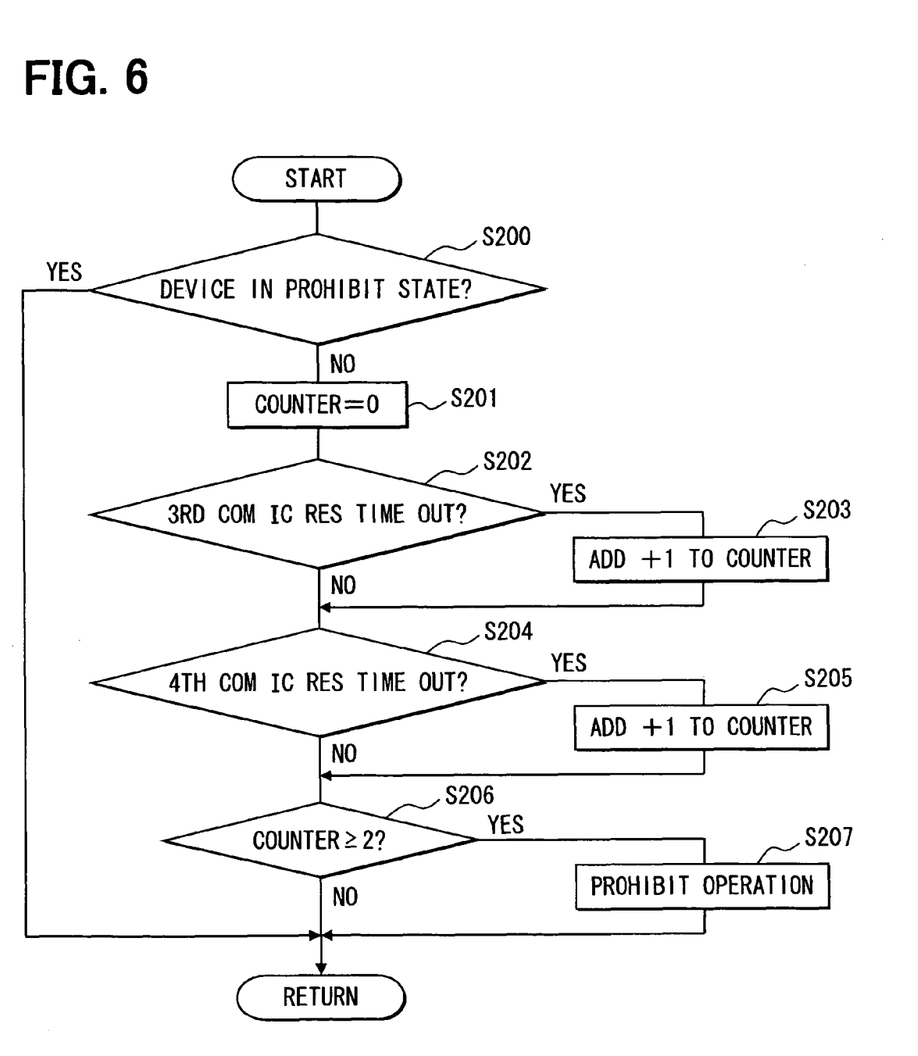
FIG. 6 is a flowchart showing a submersion determination process according to the second embodiment.

An occupant protection apparatus 2 according to a second embodiment is shown in FIGS. 5 and 6. Parts for providing the controller 209 are differently arranged on a circuit board 209i, compared with the apparatus 1 shown in FIG. 3. Further, the basis of determination of communication anomaly is limited. Specifically, the third and fourth communication ICs 209e, 209f are mounted on a lower surface of a circuit board 209i. Based on the communication anomaly of the third and fourth communication ICs 209e, 209f, the submersion is determined.

As shown in FIG. 5, the controller 209 includes a longitudinal acceleration sensor 209a, a latitudinal acceleration sensor 209b, first to fourth communication ICs 209c-209f, an ignition circuit 209g and a micro computer 209h.

The longitudinal acceleration sensor 209a, the latitudinal acceleration sensor 209b, the ignition circuit 209g and the micro computer 209h are mounted on the upper surface of the circuit board 209i. The first communication IC 209c for transmitting the detection results of the right front sensor (not shown) and the left front sensor (not shown) to the micro computer 209h is also mounted on the upper surface of the board 209i. Further, the second communication IC 209d for transmitting the detection results of the first and second right side sensors (not shown) and the first and second left side sensors (not shown) to the micro computer 209h is also mounted on the upper surface of the board 209i. However, the third and fourth communication ICs 209e, 209f are mounted on the lower surface of the board 209i.

The process for determining the submersion of the vehicle in water will be explained as follows. FIG. 6 shows a flowchart of the process for determining the submersion.

The micro computer 209h determines in Step S200 whether the occupant protection apparatus 2 has been prohibited from functioning so that the apparatus 2 is in a function prohibition state. When the apparatus 2 is in the function prohibition state, the micro computer 109h maintains the function prohibition state. In this case, the air bag and the pretensioner do not function. When the apparatus 2 is not in the function prohibition state, the micro computer 109h sets a counter value to be zero in Step S101. The counter value represents the number of communications, in which anomaly occurs.

In Step S202, the micro computer 209h determines whether the communication by using the third communication IC 209e shows response time out. When the communication of the third communication IC 209e shows the response time out, i.e., when the communication anomaly occurs in the third communication IC 209e, the micro computer 209h adds one to the counter value in Step S002. When the communication of the third communication IC 209e does not show the response time out, i.e., when the communication from the third communication IC 209e is normal, the micro computer 209h maintains the counter value so that the counter value is not changed.

In Step S204, the micro computer 209h determines whether the communication by using the fourth communication IC 209f shows response time out. When the communication of the fourth communication IC 209f shows the response time out, i.e., when the communication anomaly occurs in the fourth communication IC 209f, the micro computer 209h adds one to the counter value in Step S205. When the communication of the fourth communication IC 209f does not show the response time out, i.e., when the communication from the fourth communication IC 209f is normal, the micro computer 209h maintains the counter value so that the counter value is not changed.

In Step S206, the micro computer 209h determines whether the counter value is equal to or larger than two. Specifically, the micro computer 209h determines whether the communication anomaly occurs in more than one communication ICs 209e-209f. When the counter value is equal to or smaller than one, the micro computer 209h does not prohibit the operation of the occupant protection apparatus 2, and the apparatus 2 protects the occupant when the apparatus 2 detects the collision of the vehicle. When the counter value is equal to or larger than two, the micro computer 209h prohibits the operation of the apparatus 2 in Step S207. Specifically, the micro computer 209h determines that the communication anomaly occurs in more than one communication ICs 209e-209f, and the micro computer 209h determines that the vehicle is submerged in water. Then, the micro computer 209h prohibits from outputting the ignition signal. Thus, when the vehicle is submerged, the air bag and the pretensioner are prohibited from activating.

The controller 209 is arranged under the floor of the vehicle near a foot of an occupant on a front seat. When the vehicle is submerged, the controller 209 is also submerged. As shown in FIG. 5, the third to fourth communication ICs 209e-209f are mounted on the lower surface of the board 209i. Accordingly, when the vehicle is submerged, the communication anomaly occurs. At this time, since the ignition circuit 209g and the micro computer 209h are mounted on the upper surface of the board 209i, the micro computer 209h functions normally without being affected by the penetrated water, compared with the third to fourth communication ICs 209e-209f. The micro computer 209h can function normally longer time than the third to fourth communication ICs 209e-209f. Accordingly, the micro computer 209h can prohibit the activation of the air bag and the pretensioner based on the detection of the communication anomaly when the vehicle is submerged in water.

The effects of the apparatus 2 according to the second embodiment will be explained. The micro computer 209h determines the collision of the vehicle based on the detection results of the first and second communication ICs 209*c*, 209*d*. When the collision occurs, the acceleration, i.e., the impact is applied to the vehicle. At this time, the bus lines may be broken so that the communication anomaly of the first and second communication ICs 209*c*, 209*d* occurs. Specifically, the possibility of the communication anomaly at the first and second communication ICs 209*c*, 209*d* becomes high. However, the possibility of the communication anomaly at the third and fourth communication ICs 209*e*, 209*f* caused by bus line break is relatively low. Accordingly, the micro computer 209*h* determines the submersion of the vehicle based on the communication anomaly at the third and fourth communication ICs 209*e*, 209*f*, and therefore, the communication anomaly caused by the collision of the vehicle is not taken into consideration when the micro computer 209*h* determines the submersion of the vehicle. Thus, the submersion of the vehicle in water is surely detected by the apparatus 2.

The third to fourth communication ICs 209*e*-209*f* are mounted on the lower surface of the circuit board 209*i*, which is arranged in parallel to the ground. The micro computer 209*h* and the ignition circuit 209*g* are mounted on the upper surface of the board 209*i*. When the vehicle is submerged, the water penetrates into the vehicle. The penetrated water increases from a bottom side of the vehicle to a top side of the vehicle. Thus, the communication anomaly at the third and fourth communication ICs 209*e*-209*f* primarily occurs. Since the micro computer 209*h* and the ignition circuit 209*g* are disposed on the upper surface of the board 209*i*, the micro computer 209*h* and the ignition circuit 209*g* can function normally longer time than the third to fourth communication ICs 209*e*-209*f*. Accordingly, the micro computer 209*h* determines the submersion of the vehicle in water based on the communication anomaly at the third to fourth communication ICs 209*e*-209*f*.

The above disclosure has the following aspects.

According to a first aspect of the present disclosure, an occupant protection apparatus for a vehicle includes: a plurality of communication devices for communicating an external device; and a controller for determining a collision of the vehicle based on information transmitted from the external device via the plurality of communication devices and for activating an occupant protection device corresponding to the collision. The controller prohibits activation of the occupant protection device when the controller detects communication anomaly occurred at more than one communication device.

In the above apparatus, when the controller detects the communication anomaly at more than one communication device, the controller determines that the vehicle is submerged in water. Thus, the apparatus can detect the submersion without adding a new submersion detection element. When the vehicle is submerged, the apparatus prohibits the activation of the occupant protection device. The manufacturing cost of the apparatus is improved.

Alternatively, the controller may determine the collision based on the information about an impact applied to the vehicle, and the controller may prohibit activation of the occupant protection device based on the communication anomaly other than communication anomaly caused by the impact. In this case, by determining the submersion based on the communication anomaly other than the communication anomaly caused by the impact, the apparatus detects the submersion of the vehicle with high accuracy.

Further, the occupant protection apparatus may further include: a circuit board having upper and lower surfaces. The controller is mounted on the upper surface of the circuit board. At least two of the plurality of communication devices are mounted on the lower surface of the circuit board. Other communication devices are mounted on the upper surface of the circuit board. The controller prohibits activation of the occupant protection device based on the communication anomaly at the at least two of the plurality of communication devices on the lower surface of the circuit board, and the communication anomaly caused by the impact occurs at the other communication devices on the upper surface of the circuit board. In this case, based on the communication anomaly other than the anomaly caused by the impact, the apparatus detects the submersion of the vehicle with high accuracy. Further, the apparatus surely prohibits the activation of the occupant protection device.

Furthermore, the other communication devices may be coupled with external collision sensors, respectively. The at least two of the plurality of communication devices are coupled with external sensors other than the collision sensors, respectively, and the circuit board is disposed under a floor of a compartment of the vehicle.

Alternatively, the occupant protection apparatus may further include: an activation device mounted on the upper surface of the circuit board. The controller outputs an activation signal for activating the occupant protection device, and the activation device activates the occupant protection device based on the activation signal from the controller.

According to a second aspect of the present disclosure, an occupant protection apparatus for a vehicle include: a first communication device for coupling with an external collision sensor mounted on a front of the vehicle; a second communication device for coupling with an external collision sensor mounted on a side of the vehicle; a third communication device for coupling with an external occupant sensor; a fourth communication device for coupling with an external engine control unit; a controller for determining a collision of the vehicle based on signals transmitted from the external collision sensors via the first and second communication devices and for controlling activation of an occupant protection device based on the signals from the external collision sensors and signals transmitted from the external occupant sensor and the external engine control unit via the third and fourth communication devices; and a circuit board having upper and lower surfaces. The first and second communication devices and the controller are arranged on the upper surface of the circuit board. The third and fourth communication devices are arranged on the lower surface of the circuit board, and the controller prohibits activation of the occupant protection device when the controller detects communication anomaly occurred at both of the third and fourth communication devices.

Thus, the apparatus can detect the submersion without adding a new submersion detection element. When the vehicle is submerged, the apparatus prohibits the activation of the occupant protection device. The manufacturing cost of the apparatus is improved.

Alternatively, the circuit board may be disposed under a floor of a compartment of the vehicle, and the circuit board is arranged in parallel to the floor of the vehicle. Further, the controller may determine the communication anomaly when the controller detects a response time out of each of the third and fourth communication devices. The occupant protection device is an air bag system and a pretensioner. The external collision sensor detects acceleration applied to the vehicle so that the external collision sensor detects the collision of the vehicle. The external occupant sensor detects existence and physical information of an occupant, and the external engine control unit provides vehicle speed information. Furthermore, the occupant protection apparatus may further include: an activation device mounted on the upper surface of the circuit board. The controller outputs an activation signal for activating the occupant protection device. The activation device activates the occupant protection device based on the activation signal from the controller, and the controller stops outputting the activation signal when the controller detects the communication anomaly occurred at both of the third and fourth communication devices.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An occupant protection apparatus for a vehicle comprising:
    a plurality of communication devices for communicating an external device;
    a controller for determining a collision of the vehicle based on information transmitted from the external device via the plurality of communication devices and for activating an occupant protection device corresponding to the collision; and
    a circuit board having upper and lower surfaces; wherein
    the controller prohibits activation of the occupant protection device when the controller detects communication anomaly occurred at more than one communication device;
    the controller determines the collision based on the information about an impact applied to the vehicle;
    the controller prohibits activation of the occupant protection device based on the communication anomaly other than communication anomaly caused by the impact;
    the controller is mounted on the upper surface of the circuit board;
    at least two of the plurality of communication devices are mounted on the lower surface of the circuit board;
    other communication devices are mounted on the upper surface of the circuit board;
    the controller prohibits activation of the occupant protection device based on the communication anomaly at the at least two of the plurality of communication devices on the lower surface of the circuit board;
    the communication anomaly caused by the impact occurs at the other communication devices on the upper surface of the circuit board;
    the other communication devices are coupled with external collision sensors, respectively;
    the at least two of the plurality of communication devices are coupled with external sensors other than the collision sensors, respectively; and
    the circuit board is disposed under a floor of a compartment of the vehicle.

2. The occupant protection apparatus according to claim 1, further comprising:
    an activation device mounted on the upper surface of the circuit board,
    wherein the controller outputs an activation signal for activating the occupant protection device, and
    wherein the activation device activates the occupant protection device based on the activation signal from the controller.

3. An occupant protection apparatus for a vehicle comprising:
    a first communication device for coupling with an external collision sensor mounted on a front of the vehicle;
    a second communication device for coupling with an external collision sensor mounted on a side of the vehicle;
    a third communication device for coupling with an external occupant sensor;
    a fourth communication device for coupling with an external engine control unit;
    a controller for determining a collision of the vehicle based on signals transmitted from the external collision sensors via the first and second communication devices and for controlling activation of an occupant protection device based on the signals from the external collision sensors and signals transmitted from the external occupant sensor and the external engine control unit via the third and fourth communication devices; and
    a circuit board having upper and lower surfaces,
    wherein the first and second communication devices and the controller are arranged on the upper surface of the circuit board,
    wherein the third and fourth communication devices are arranged on the lower surface of the circuit board, and
    wherein the controller prohibits activation of the occupant protection device when the controller detects communication anomaly occurred at both of the third and fourth communication devices.

4. The occupant protection apparatus according to claim 3, wherein the circuit board is disposed under a floor of a compartment of the vehicle, and
    wherein the circuit board is arranged in parallel to the floor of the vehicle.

5. The occupant protection apparatus according to claim 4, wherein the controller determines the communication anomaly when the controller detects a response time out of each of the third and fourth communication devices,
    wherein the occupant protection device is an air bag system and a pretensioner,
    wherein the external collision sensor detects acceleration applied to the vehicle so that the external collision sensor detects the collision of the vehicle,
    wherein the external occupant sensor detects existence and physical information of an occupant, and
    wherein the external engine control unit provides vehicle speed information.

6. The occupant protection apparatus according to claim 5, further comprising:
    an activation device mounted on the upper surface of the circuit board,
    wherein the controller outputs an activation signal for activating the occupant protection device,
    wherein the activation device activates the occupant protection device based on the activation signal from the controller, and
    wherein the controller stops outputting the activation signal when the controller detects the communication anomaly occurred at both of the third and fourth communication devices.

* * * * *